United States Patent
Hirai

[11] Patent Number: 5,997,035
[45] Date of Patent: *Dec. 7, 1999

[54] RESIN AIR BAG

[75] Inventor: Kinji Hirai, Kanagawa, Japan

[73] Assignee: Takata Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,160

[22] Filed: Aug. 6, 1997

[51] Int. Cl.$^6$ .................................................... B60R 21/16
[52] U.S. Cl. ............................................................ 280/743.1
[58] Field of Search ............................... 280/743.1, 743.2

[56] References Cited

U.S. PATENT DOCUMENTS

| | | | |
|---|---|---|---|
| 5,114,180 | 5/1992 | Kami et al. | 280/743.1 |
| 5,312,132 | 5/1994 | Pillet | 280/743.1 |
| 5,630,620 | 5/1997 | Hirai et al. | 280/743.1 |

FOREIGN PATENT DOCUMENTS

| | | | |
|---|---|---|---|
| 0 489 320 | 6/1992 | European Pat. Off. | |
| 2-31965 | 2/1990 | Japan. | |
| 4-146839 | 5/1992 | Japan | 280/743.1 |
| 4-266544 | 9/1992 | Japan. | |
| 91/18767 | 12/1991 | WIPO | 280/743.1 |

*Primary Examiner*—Paul N. Dickson
*Attorney, Agent, or Firm*—Foley & Lardner

[57] ABSTRACT

To design an air bag in such a manner that a joint between synthetic resin sheets composing the air bag is directed to an instrument panel when the air bag is deployed, an air bag 1 is formed by joining together a circular front panel 2 and a circular rear panel 3 having an opening 4 through which an inflator is inserted in the center of the rear panel 3. The front and rear panels 2 and 3 are each made of synthetic resin sheet. The thickness of the front panel 2 is greater than that of the rear panel 3 so that a joint 5 is directed to an instrument panel when the air bag is deployed.

7 Claims, 3 Drawing Sheets

RESIN AIR BAG

BACKGROUND OF THE INVENTION

The present invention relates to an air bag made up of resin sheets joined each other. The purpose of an air bag device is to protect an occupant by deploying an air bag when a vehicle comes into collision.

Conventionally, an air bag is typically made of woven textile of fiber, such as polyamide fiber, surfaced with a silicone rubber coating. In recent years, however, an air bag made of resin film (Japanese Unexamined Patent Publication No. 2-31965/1990) and an air bag made of elastomer (Japanese Unexamined Patent Publication No. 4-266544/1992) have been proposed as alternatives to the conventional air bag.

SUMMARY OF THE INVENTION

As for an air bag which is made up of resin sheets and formed in a bag shape by joining the resin sheets, there are two cases: where the joined portion or joint is positioned inside the air bag and where the joint is positioned to project outward from the air bag. To position the joint inside the air bag as the former, it is necessary to turn the bag inside out to reverse the inner surface and the outer surface of the bag after sheets are joined together to make the bag and it is a time-consuming work. In view of manufacturing cost, it is preferable to position the joint outside the air bag. In case where the joint is positioned outside the air bag, the joint is positioned in the side periphery of the deployed air bag in order to prevent the joint from coming in contact with the occupant.

It is an object of the present invention to provide an air bag of which a joined portion or a joint is positioned outside the air bag and is directed away from an occupant when the air bag is deployed.

A resin air bag according to this invention comprises a plurality of resin sheets of which peripheries are lapped one over the other and joined together to form a bag shape. One surface of each sheet is an inner surface facing the inside direction of the air bag, other surface is an outer surface facing the outside direction of the air bag. At the joined portion of the sheets, the inner surface of one of said sheets is in contact with the inner surface of the other sheet and the joint is positioned around the side periphery of the air bag when it is deployed. The sheet close to an occupant may have a thickness greater than that of the sheet away from the occupant at least at and around the joint.

A resin air bag according to this invention comprises a plurality of resin sheets of which peripheries are lapped one over the other and joined together to form a bag shape. One surface of each sheet is an inner surface facing the inside direction of the air bag, other surface is an outer surface facing the outside direction of the air bag. At the joined portion of the sheets, the inner surface of one of said sheets is in contact with the inner surface of the other sheet and the joint is positioned around the side periphery of the air bag when it is deployed. The sheets may be equal in thickness, and one of the sheets close to an occupant has greater stiffness, at least at and around the joint, than that of the sheet away from the occupant.

At and around the joint of the sheets of the resin air bag of this invention, one of the sheets close to the occupant (hereinafter, sometimes referred to as the occupant side sheet) has stiffness higher than that of the sheet away from the occupant (hereinafter, sometimes referred to as the instrument panel side sheet). As tensile stress is applied on the joint when the air bag is deployed, the joint is folded to the instrument panel side because of lower stiffness. Therefore, the joint projecting out of the side periphery of the deployed air bag can be directed away from the occupant (toward the front of the vehicle).

The air bag of the present invention is suitable as a driver-side air bag. The driver-side air bag generally comprises a circular front panel to be face an occupant and a circular rear panel to be face an instrument panel which are joined together at their peripheries. The front panel has a thickness, at least at and around the joint, greater than that of the rear panel so that the joint projecting out of the side periphery of the deployed air bag is directed to the instrument panel.

In the present invention, the front panel and the rear panel may be usually uniform in thickness throughout the respective panels and the sheet close to the occupant may have a thickness greater than that of the sheet away form the occupant only at and around the joint. In this case, the occupant side sheet may be formed to have a greater thickness only at the periphery thereof by injection molding or the like or by joining another sheet on the occupant side sheet at and around the joint.

It is preferable that the resin sheet is synthetic resin sheet.

PREFERRED EMBODIMENTS OF THE INVENTION

Hereinafter, embodiments of the invention will be described with reference to the drawings.

Figure 1:
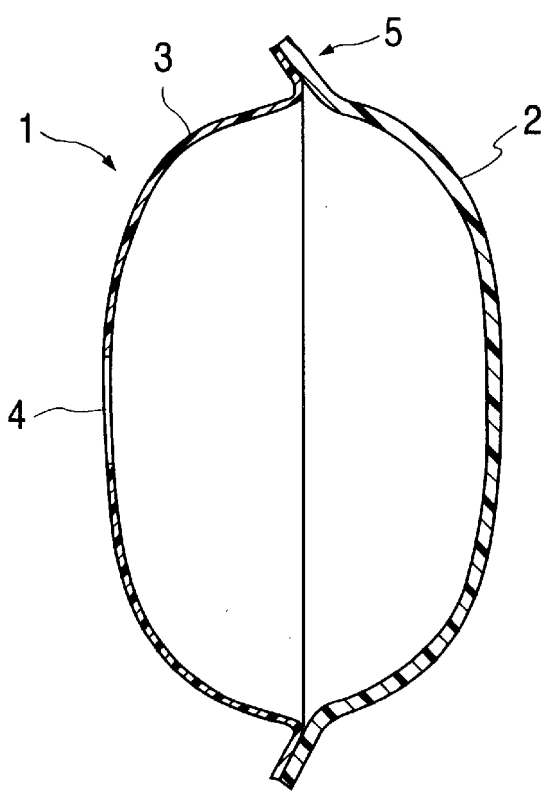
FIG. 1 is a sectional view of an air bag according to an embodiment, in its deployed state.
Figure 2:
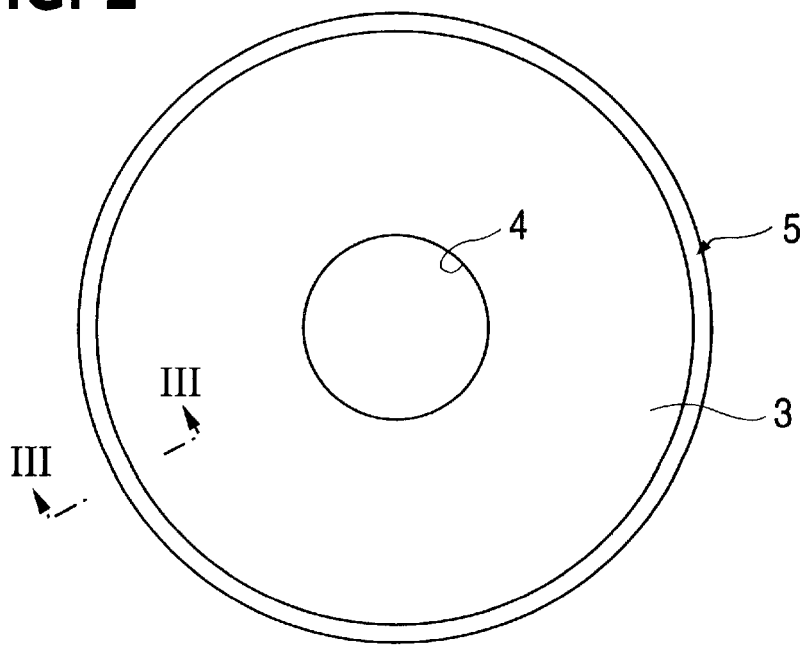
FIG. 2 is a rear view of the air bag shown in FIG. 1.
Figure 3:
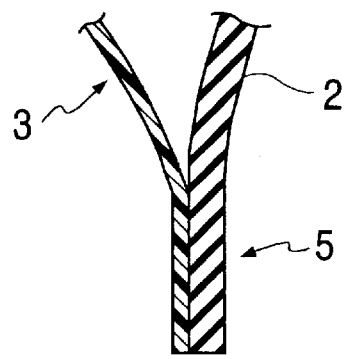
FIG. 3 is a sectional view showing the structure of a part taken along the line III—III of FIG. 2.

FIG. 1 is a sectional view showing a driver-side air bag 1 according to an embodiment of the present invention, in its deployed state, FIG. 2 is a rear view of the air bag 1, and FIG. 3 is a sectional view showing the structure of a part taken along the line III—III of FIG. 2.

The air bag 1 comprises a circular front panel 2 and a circular rear panel 3 having an opening 4 through which an inflator (not shown) is inserted in the center of the rear panel 3. The front and rear panels 2 and 3 are made of synthetic resin sheet. The front panel 2 and the rear panel 3 are joined together around their peripheries by a joining method such as adhesion using adhesives, heat fusion and the like to form a bag shape. The numeral 5 designates a joint formed in such a manner.

In this embodiment, the front panel 2 to be face an occupant and the rear panel 3 to be face an instrument panel are usually uniform in thickness throughout the respective panels. The thickness of the front panel 2 is greater than that of the rear panel 3.

The suitable material for the panels 2 and 3 is thermoplastic resin, particularly thermoplastic elastomer. In this case, the thickness of the front panel 2 is preferably between 0.8 mm and 0.3 mm, more preferably between 0.7 mm and 0.4 mm, and the thickness of the rear panel 3 is preferably between 0.7 mm and 0.2 mm, more preferably between 0.6 mm and 0.3 mm. It is preferable that the thickness of the front panel 2 is 115–200%, particularly 120–150% of the thickness of the rear panel 3. Though the width of the joint 5 is preferably between 2 mm and 15 mm, more preferably 5 mm and 10 mm, it is not limited thereto depending on joining method. Any width capable of providing the required strength of the air bag is enough.

When the air bag 1 structured as mentioned above is deployed by gases from the inflator, the joint 5 is directed away from the occupant 5 (in the direction toward the instrument panel) as shown in FIG. 1. Therefore, the probability that the joint 5 comes into contact with the occupant is decreased.

Figure 4:
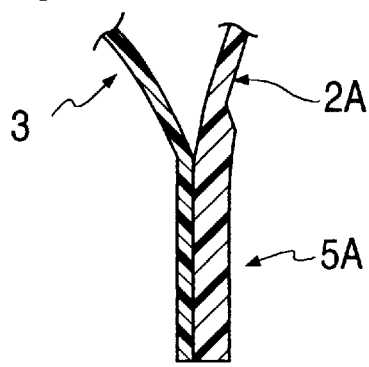
FIG. 4 is a sectional view of main parts of an air bag according to another embodiment.
Figure 5:
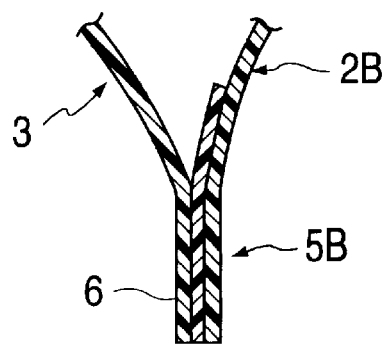
FIG. 5 is a sectional view of main parts of an air bag according to still another embodiment.

FIG. 4 and FIG. 5 are sectional views similar to FIG. 3, showing joints 5A, 5B of air bags according to another embodiments, respectively.

Referring to FIG. 4 and FIG. 5, front panels 2A, 2B have thickness greater than that of the rear panel 3 only at and around joints 5A, 5B.

Referring to FIG. 4, the front panel 2A is formed integrally with a portion corresponding to the joint 5A by injection molding or the like. Referring to FIG. 5, a sheet 6 is joined on the front panel 2B by adhesion, heat fusion or the like so as to increase the thickness of the front panel 2B at and around the joint.

Though the sheet 6 may be joined on the front panel 2B beforehand, the sheet 6 may be joined on the front panel 2B at the same time that the front panel 2B and the rear panel 3 are joined together.

Figure 6:
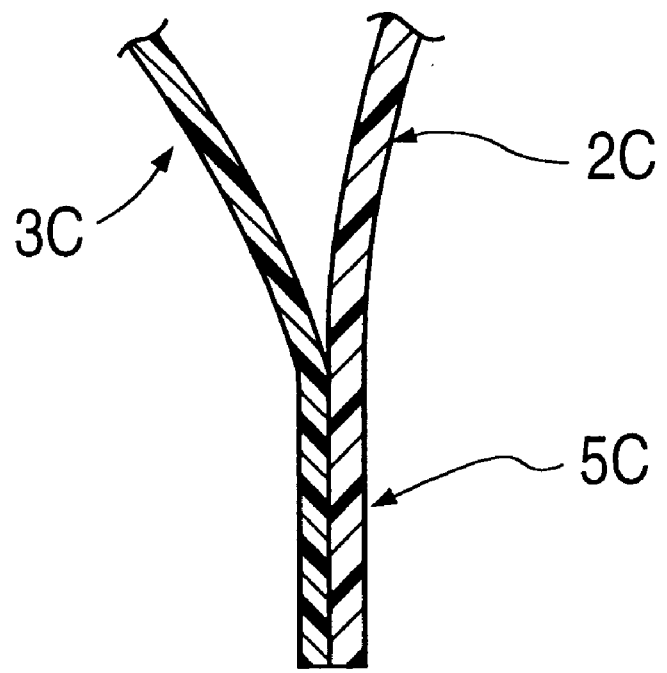
FIG. 6 is a sectional view of main parts of an air bag according to still yet another embodiment.

FIG. 6 is a sectional view showing a joint 5C of an air bag according to another embodiment of this invention.

As for the air bag, the front panel 2C is equal to the rear panel 3C in thickness. The front panel 2C is made of resin having stiffness greater than that of the resin of the rear panel 3C. In this case, the thickness of each panel 2C, 3C is preferably between 0.2 mm and 0.8 mm, more preferably between 0.3 mm and 0.7 mm. It is preferable that he stiffness of the front panel 2C is 115–200%, more preferably 120–150% of the stiffness of the rear panel 3. Though the width of the joint is preferably 2–5 mm, more preferably 5–10 mm, the width is not limited thereto.

In the air bags in FIGS. 4, 5, 6, the joint is directed away from the occupant when the air bag is deployed as well as the air bag in FIGS. 1 through 3.

Though the embodiments mentioned above relates to a driver-side air bag, the present invention can be applied to a passenger-side or rear seat-side air bag.

As apparent from the above description, as for the air bag made of synthetic resin of the present invention, the joint projecting outside the air bag is directed away from the occupant when the air bag is deployed so as to prevent the joint from coming into contact with the occupant.

What is claimed is:

1. A resin air bag comprising:
   a plurality of resin sheets, peripheries of the resin sheets being lapped one over the other and joined together at a joined portion to form a pouch shaped air bag; wherein
   each of the sheets comprises an inner surface which faces in an inside direction of the air bag and an outer surface which faces in an outside direction of the air bag;
   the inner surface of one of said sheets is in contact with the inner surface of the other sheet and the joined portion is positioned to extend outwardly from a periphery of the air bag when the air bag is deployed; further wherein
   the sheet which is to be positioned closest to an occupant of a vehicle in which the air bag is deployed has an unfolded thickness greater than that of the sheet which is to be positioned farthest away from the occupant only at and around the joined portion sufficient to allow the joined portion to be folded away from the occupant upon deployment of said air bag.

2. A resin air bag according to claim 1, wherein the air bag is a driver-side air bag, the sheets comprises a circular front panel and a circular rear panel, the air bag being formed by joining peripheries of said panels.

3. A resin air bag according to claim 1, wherein the sheet which is to be positioned closest to the occupant has a greater thickness at and around the joined portion than in the remainder of the sheet.

4. A resin air bag comprising:
   a plurality of resin sheets, peripheries of the resin sheets being lapped one over the other and joined together at a joined portion to form a pouch shaped air bag; wherein
   each of the sheets comprises an inner surface which faces in an inside direction of the air bag and an outer surface which faces in an outside direction of the air bag;
   the inner surface of one of said sheets is in contact with the inner surface of the other sheet and the joined portion is positioned to extend outwardly from a periphery of the air bag when the air bag is deployed; further wherein
   the sheet which is to be positioned closest to an occupant of a vehicle in which the air bag is deployed has a stiffness greater than and a thickness substantially equal to that of the sheet which is to be positioned farthest away from the occupant at least at and around the joined portion sufficient to allow the joined portion to be folded away from the occupant upon deployment of said air bag.

5. A resin air bag according to claim 1, wherein said resin is synthetic resin.

6. A resin air bag as recited in claim 4, wherein said sheet which is to be positioned closest to an occupant of a vehicle in which the air bag is deployed comprises a first resin and said sheet which is to be positioned farthest away from the occupant comprises a second resin and wherein said sheet comprising said first resin has a stiffness 115% to 200% greater than a stiffness of said sheet comprising said second resin.

7. A resin air bag as recited in claim 6, wherein said sheet comprising said first resin has a stiffness 120% to 150% greater than a stiffness of said sheet comprising said second resin.

* * * * *